United States Patent [19]
Furuhashi

[11] Patent Number: 5,978,492
[45] Date of Patent: Nov. 2, 1999

[54] SOUND SOURCE DATA GENERATION METHOD, RECORDING MEDIUM, AND SOUND SOURCE DATA PROCESSING DEVICE

[75] Inventor: Makoto Furuhashi, Kanagawa, Japan

[73] Assignee: Sony Corporation, Tokyo, Japan

[21] Appl. No.: 08/565,916

[22] Filed: Dec. 1, 1995

[30] Foreign Application Priority Data

Dec. 2, 1994 [JP] Japan .................................. 6-300019
Dec. 2, 1994 [JP] Japan .................................. 6-300031

[51] Int. Cl.$^6$ ........................................ H04B 1/00
[52] U.S. Cl. ...................... 381/119; 364/400.01; 381/61; 381/63
[58] Field of Search ................ 381/119, 61, 63, 381/2; 364/400.01

[56] References Cited

U.S. PATENT DOCUMENTS 4,479,240 10/1984 McKinley, Jr. .......................... 381/119
5,647,008 7/1997 Farhangi et al. ........................ 381/119

*Primary Examiner*—Forester W. Isen
*Attorney, Agent, or Firm*—Hill & Simpson

[57] ABSTRACT

Sound source data is constituted by a 14-byte sound data area SA consisting of 28 samples of 4-bit adaptive differential PCM data and a sound parameter area PA consisting of loop information LP, filter information FL and a shift amount RA.

In encoding the sound source data, a CD-ROM XA encoder may be employed.

4-bit ADPCM data is decoded by a BRR decoder 53, pitch-converted by a pitch conversion unit 54, and then processed with envelope transform by an envelope generator 58. After that, sound outputs of left and right channels outputted with the sound volume adjusted by volumes 60L, 60R, and 16-bit PCM data with the sound volume adjusted by a mixing volume 65, are added by an adder 62. Further, the sound data from the mixing volume 65, or an addition output produced by adding the sound data from the mixing volume 65 with the sound data from the volumes 60L, 60R, is reverberated by a reverberation processor 68. The sound data with the sound volume adjusted by a reverberation volume 69 and the sound data from the adder 62 are added.

The sound source data and the real sound data can be easily mixed in a single circuit.

30 Claims, 8 Drawing Sheets

| FILTER INFORMATION FL | COEFFICIENT a | COEFFICIENT b | FUNCTION |
|---|---|---|---|
| 0 | $a_0$ | $b_0$ | STRAIGHT |
| 1 | $a_1$ | $b_1$ | FIRST-ORDER |
| 2 | $a_2$ | $b_2$ | SECOND-ORDER (LEVEL B) |
| 3 | $a_3$ | $b_3$ | SECOND-ORDER (LEVEL C) |

SOUND SOURCE DATA GENERATION METHOD, RECORDING MEDIUM, AND SOUND SOURCE DATA PROCESSING DEVICE

BACKGROUND OF THE INVENTION

This invention relates to a sound source data generating method employed for generating sound effects and background music (BGM), a recording medium in which information of such sound source data is recorded, and a sound source data processing device for generating sounds using the sound source data.

Conventionally, electronic musical instruments, game equipment and information processing devices, such as, personal computers, generate musical sounds and sound effects.

For generating the musical sounds or sound effects, signals like square wave signals, triangular wave signals and sine wave signals are supplied to plural preset frequency dividers with different frequency division ratios and duty ratios, and the individual sound source signals outputted from the frequency dividers, that is, so-called voices, are synthesized at a desired level.

For musical instruments, such as, piano and drum, the entire sound portion of a sound is divided into four sections, that is, attack, decay, sustain and release sections, so that the amplitude or the level of the signal in each section characteristically changes. To deal with the changes, so-called ADSR control is carried out to cause similar changes of the signal level of each voice.

In addition, for electronic musical instruments, a so-called FM sound source for frequency-modulating sine wave signals with sine wave signals of low frequency is known. Thus, various sound signals can be generated by fewer sound source data with modulation factors used as temporal functions.

It is to be noted that noise may be used as a sound source of sound effects.

Meanwhile, for executing a game program with game equipment or an information processing device like a personal computer, the start, stop and sound volume of sound effects and background music (BGM) to be generated are changed in real time in accordance with proceedings of the game program or operations of the game equipment and information processing device by a user.

The sound information for sound effects or BGM is adaptive differential PCM (so-called ADPCM) data which is produced by compressing digitally recorded various 16-bit digital data, then performing bit rate reduction of 4 bits or BRR encoding, and blocking the resulting data. The ADPCM data is sound data for fundamental waveform. That is, the game equipment and the information processing device are provided with a so-called PCM sound source using the sound source data for generating musical intervals with the read-out cycle of the sound source data in response to indicated musical intervals.

Figure 6:
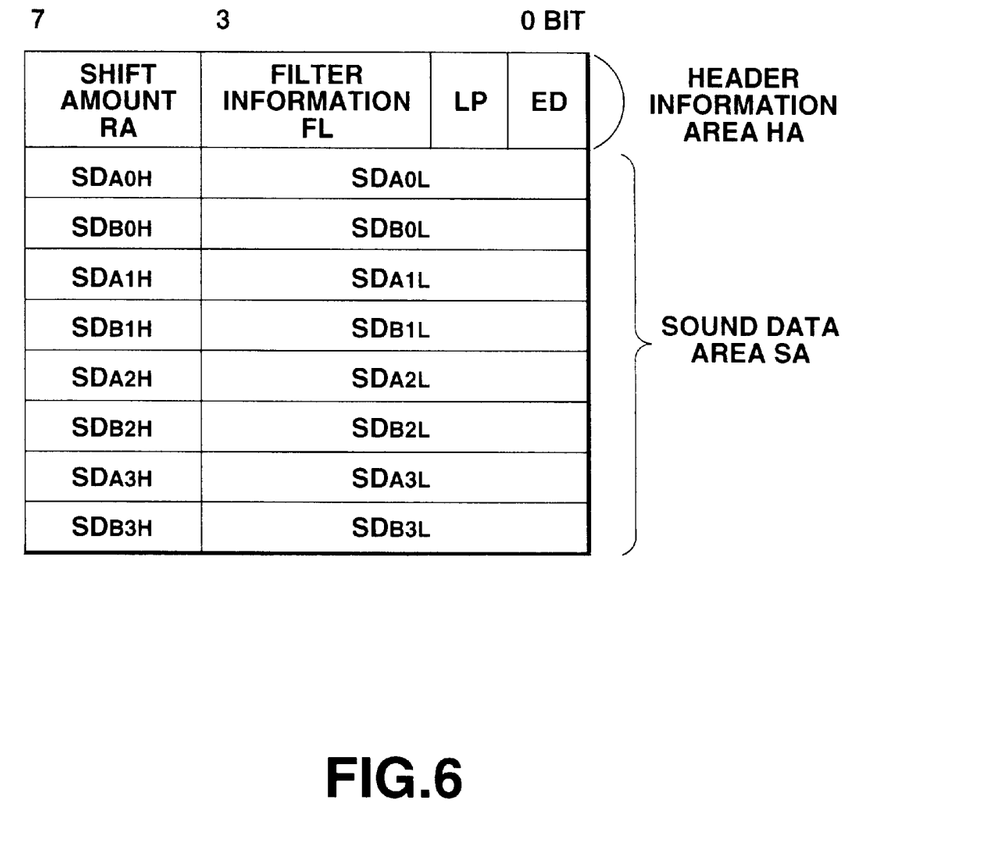
FIG. 6 is a view showing the structure of the conventional sound source data.

The sound source data in a case where 4-bit ADPCM data is used as sound information will now be described in detail with reference to FIG. 6.

This sound source data is constituted on the basis of a block having 9 bytes composed of 8 horizontal bits and 9 vertical bits. The block is constituted by a 1-byte header information area HA consisting of additional information of the sound source data and an 8-byte sound data area SA consisting of 16 samples of sound source data or so-called sound data.

The header information area HA is constituted by 1-bit block end information ED, 1-bit loop information LP, filter information FL used for decoding, and a 4-bit shift amount RA.

The block end information ED indicates whether the block is the last block of the sound source data or not. The loop information LP indicates whether the sound data of the block is to be looped or not. When 1 is raised for the loop information LP, the sound data is looped. When 0 is raised for the loop information LP, the data is not looped.

BRR encoding is performed when the sound source data for each block is generated. The filter information FL indicates information of a filter to be used for performing BRR decoding corresponding to BRR encoding. With this filter information FL, a fixed predictive filter which is optimum for each block, that is, a fixed predictive filter having least errors, is selected from plural fixed predictive filters.

The shift amount RA is a parameter for expanding a 4-bit value to a 16-bit value in BRR decoding.

The sound data area SA includes 16 samples of sound data $SD_{AOL}$ to $SD_{B3H}$.

Meanwhile, since 1 block consists of 9 bytes in the conventional sound source data, it requires complex BRR decoding.

Also, among optical discs employed for optically recording and reproducing data, a CD-ROM using a compact disc (CD) which is a read-only optical disc as a read-only memory has been recently used as a recording medium for recording sound source data. Therefore, it is preferred that the sound source data is based on the standard of CD-ROM pictures and sound source data, that is, CD-ROM XA.

Although the sound source data in which 1 block consists of 9 bytes has a block length consisting of 16 samples of sound data, this block length is not based on the CD-ROM XA standard. Therefore, the predictive filter employed for BRR encoding for generating the conventional sound source data differs from a predictive filter employed for BRR encoding for generating the sound source data based on the CD-ROM XA standard. In addition, since the predictive filter corresponding to BRR encoding is employed in performing BRR decoding of the sound source data, the predictive filter for the sound source data based on the CD-ROM XA standard cannot be used for decoding the conventional sound source data.

Further, since the loop information in the header information area of the sound source data simply indicates whether the sound data is to be looped or not, the control for looping of the sound source data becomes complex.

In view of the foregoing, it is an object of the present invention to provide a sound source data generating method for generating sound source data based on the CD-ROM XA standard in which simple processing suffices for generating sounds, a recording medium for recording the sound source data generated by the sound source data generating method, and a sound source data processing device for generating sounds using the sound source data generated by the sound source data generating method.

Meanwhile, when the sound output synthesized by the conventional PCM sound source is used for sound effects during a game program, the sound output is outputted in most cases with an overlap with musical tunes like BGM. In this case, it is necessary to mix the sound output for the sound effects with the musical tunes like BGM for outputting. Since a sound signal outputted from other processing circuit than the PCM sound source is used as the sound signal to be mixed, mixing of the sound output with the sound signal is complex. Also, the circuit structure therefor is enlarged.

Thus, in view of the foregoing, it is an object of the present invention to provide a sound data processing device which is capable of easily mixing the sound output synthesized from the sound source data with the sound signal.

According to the present invention, there is provided a sound source data generating method including the steps of: generating 14-byte sound information consisting of 28 samples of 4-bit adaptive differential PCM data; and generating 2-byte sound source parameters consisting of start information and end information of a looping section, predictive filter information expressing the type of an adaptive differential PCM predictive filter, and range information for expanding the 4-bit adaptive differential PCM data to 16-bit data, to generate 16-byte sound source data based on complete blocks from the 14-byte sound information and the 2-byte sound source parameters.

According to the present invention, there is also provided a recording medium having recorded therein 16-byte sound source data based on complete blocks, the 16-byte sound source data being constituted by 14-byte sound information consisting of 28 samples of 4-bit adaptive differential PCM data, and by 2-byte sound source parameters consisting of start information and end information of a looping section, predictive filter information expressing the type of an adaptive differential PCM predictive filter, and range information for expanding the 4-bit adaptive differential PCM data to 16-bit data.

According to the present invention, there is also provided a sound source data processing device including: memory means for storing therein 16-byte sound source data based on complete blocks which is constituted by 14-byte sound information consisting of 28 samples of 4-bit adaptive differential PCM data, and by 2-byte sound source parameters consisting of start information and end information of a looping section, predictive filter information expressing the type of an adaptive differential PCM predictive filter, and range information for expanding the 4-bit adaptive differential PCM data to 16-bit data; and decoding means for decoding the 4-bit adaptive differential PCM data in the block to 16-bit data using the predictive filter information and rate information of the sound source data based on blocks stored in the memory means.

The start information and the end information of the looping section are information indicating a start block and an end block respectively of a looping section composed of one or more blocks.

According to the present invention, there is provided a sound data processing device including: envelope means for providing an envelope for enclosing sound source data consisting of 4-bit adaptive differential PCM data and sound data which is 16-bit PCM data different from the sound source data; and sound output means for decoding the sound source data read out from the envelope means to perform pitch conversion and outputting sounds with a signal level controlled; and mixing means for mixing a sound output from the sound output means with the real sound data read out from the envelope means.

The sound data processing device according to the present invention further includes: second mixing means for mixing the real sound data with the sound output from the sound output means; and reverberation sound data mixing means for mixing sound data from the second mixing means, temporally shifted forward or backward, with the sound data from the mixing means.

In the present invention, the sound source data and the real sound data are enclosed in an envelope, and the 16-bit sound output generated from the sound source data which is the 4-bit adaptive differential PCM data and the 16-bit PCM data which is the real sound data different from the sound source data are arbitrarily mixed.

Also, in the present invention, the second mixing means is provided so that the sound data mixed by the second mixing means is temporally shifted and mixed with the sound data from the mixing means to generate the reverberation sound data.

In the present invention, since the sound information has a structure of 28 samples similar to that of CD-ROM XA, a predictive filter employed in the CD-ROM XA encoding device may be used for encoding the sound information. Also, as the block is set to 16 bytes, decoding may be easily carried out.

In addition, as the information indicating the start block and the end block of the looping section is provided in each block, looping of plural blocks may be performed.

DETAILED DESCRIPTION OF THE PRESENTLY PREFERRED EMBODIMENTS

Figure 1:
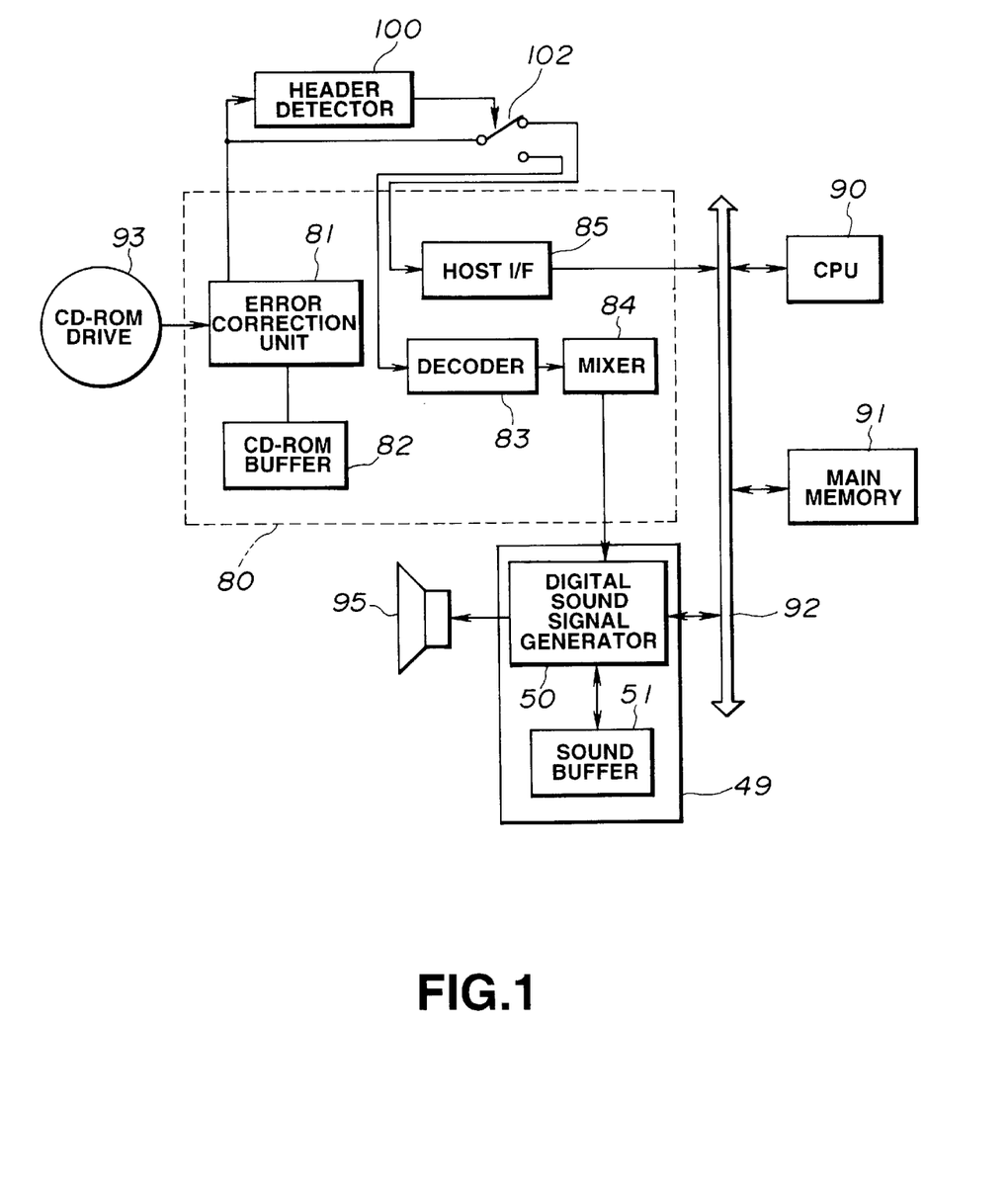
FIG. 1 is a view schematically showing the structure of an embodiment of a sound output unit using a sound source data processing device according to the present invention.

A preferred embodiment of the present invention will now be described with reference to the attached drawings. FIG. 1 schematically shows the structure of a sound output unit having a sound source data processing device for outputting sounds using sound source data generated by the sound source data generating method according to the present invention.

A CD-ROM drive 93 of FIG. 1 uses a CD-ROM as a recording medium. The CD-ROM employs a compact disc (CD) which is a read-only optical disc as a read-only memory among optical discs used for optically recording and reproducing data.

In FIG. 1, a central processing unit (CPU) 90 composed of a micro processor is connected to a bus 92. A main memory 91 used by the CPU 90 for enclosing data therein, a CD-ROM decoder 80 for decoding data read out from the CD-ROM in the CD-ROM drive 93, and a sound source data processing device 49 for generating sounds using sound data read out from the CD-ROM, are also connected to the bus 92. The sound source data processing device 49 is constituted by a digital sound signal generator 50 for processing sound source data and a sound buffer 51 for enclosing the sound source data. The digital sound signal generator 50 is connected with a speaker unit 95 for outputting sounds to outside.

The sound data is read out from the CD-ROM drive 93 at a control command from the CPU 90, and is enclosed in a CD-ROM buffer 82 in the CD-ROM decoder 80. The sound data enclosed in the CD-ROM buffer 82 is fed to an error correction unit 81. The error correction unit 81 performs error correction of the data fed thereto.

The output of the error correction unit 81 is connected to a header detector 100. The header detector detects the header of the data block, and operates a switch 102 accordingly. The switch 102 supplies the output of the error correction unit 81 either to a host I/F unit 85, or to an ADPCM decoder 83. If the header detected by the header detector 100 is for sound effects, then the switch 102 connects its output to the host I/F unit 85. On the other hand, if the detected header is one for musical tunes, the switch 102 is operated the other way, to supply the output to the decoder 83.

The sound data includes sound data to be outputted as musical tunes in which musical sounds continue, such as, background music (BGM), and sound data for generating sounds like sound effects. Specifically, the sound data outputted as musical tunes among the error-corrected sound data is 4-bit ADPCM data based on CD-ROM XA standard for CD-ROM sound data, and 16-bit PCM data based on CD-DA standard for sound data in the music CD. The sound source data for generating sounds like sound effects is the 4-bit ADPCM data.

The CPU 90 detects whether the sound data is the sound data to be outputted as musical tunes or the sound data for generating sounds like sound effects. The CPU 90 performs control such that the sound data outputted as musical tunes is fed to the decoder 83. The decoder 83 only decodes the ADPCM data, and outputs 16-bit PCM data to a mixer 84. The mixer 84 mixes PCM data of left and right stereo channels, with the decrement amount digitally changed. The sound data outputted from the mixer 84 is entered to the digital sound signal generator 50.

On the other hand, the sound data for generating sounds like sound effects is entered to the digital sound signal generator 50 from a host interface (I/F) 85 via the bus 92. Then, the sound data is stored in the sound buffer 51 by the digital sound signal generator 50.

Figure 2:
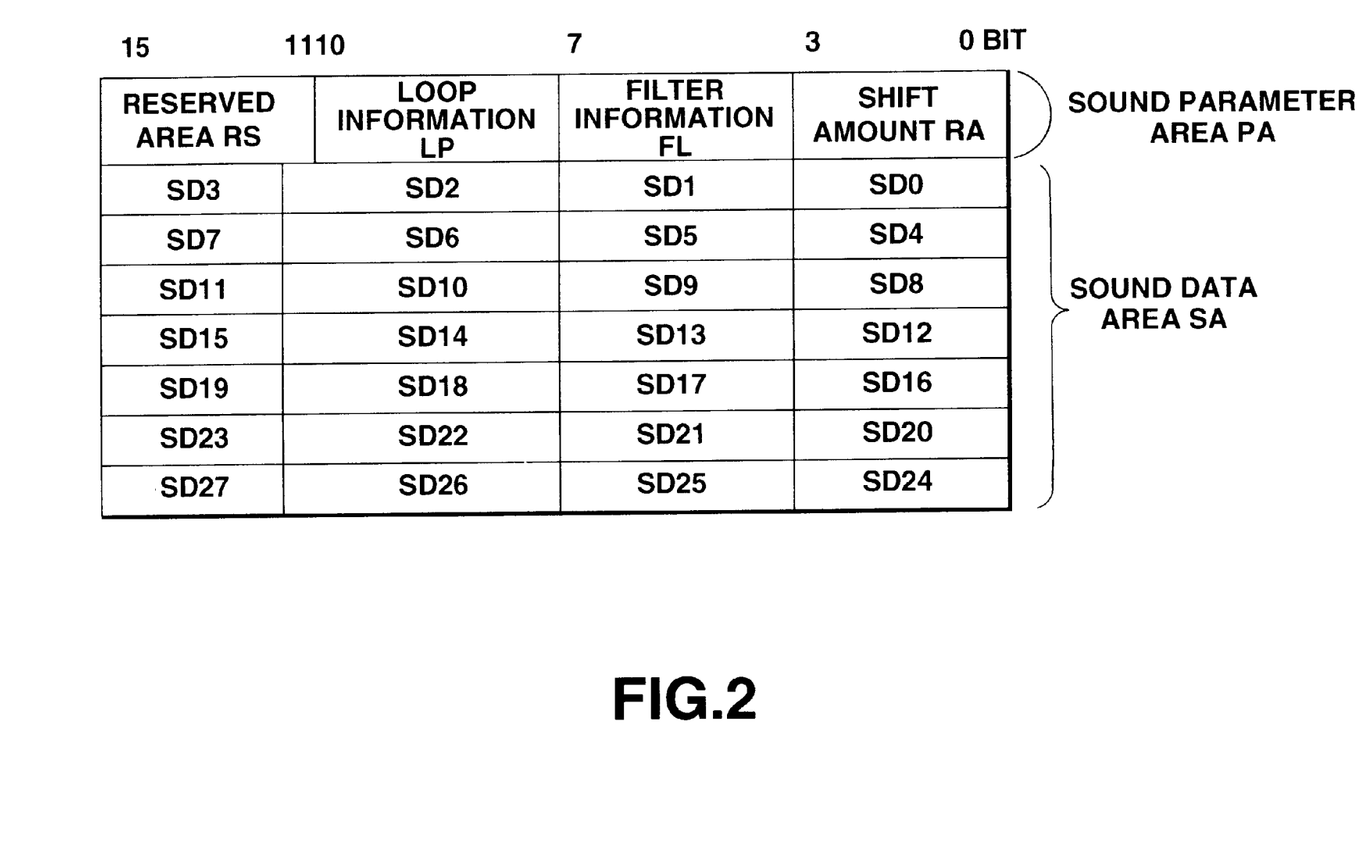
FIG. 2 is a view showing the structure of sound source data.

FIG. 2 shows the sound data stored in the sound buffer 51.

This sound data is constituted on the basis of a block consisting of 16 bytes of 16 horizontal bits and 8 vertical bits. The block is constituted by a 2-byte sound parameter area PA as header information of the sound information of the sound source data, and a 14-byte sound data area SA consisting of 28 samples of sound information (sound data).

The sound parameter area PA consists of a 4-bit shift amount RA, 4-bit filter information FL, 3-bit loop information LP and 5-bit reserved area RS.

The shift amount RA is a parameter for expanding the 4-bit value to a 16-bit value in BRR decoding. This shift amount RA takes values of 0 to 12, and is expressed by the following equation (1).

$$(\text{16-bit data}) = 2^{(12-RA)} \cdot (\text{4-bit data}) \qquad (1)$$

BRR encoding is performed when the sound data based on the block is generated, and the filter information FL indicates information of a filter used for performing BRR decoding corresponding to BRR encoding. With this filter information FL, a predictive filter which is optimum for each block, that is, a predictive filter having least errors, is selected from plural predictive filters as later described.

The loop information LP has a 1-bit loop end flag EF, a loop flag LF and a loop start flag LSF sequentially from the side of less significant bits. The loop start flag LSF, when representing 1, indicates that the block is at the start of the loop. The loop flag LF indicates whether the sound source data has a loop or not. The loop flag LF, when representing 1, indicates that the sound source data has a loop. In the sound source data having a loop, bits of the loop flag LF of all the blocks are set to 1. The loop end flag EF indicates that the block is the last block of the sound source data.

The sound data area SA includes 28 samples of sound data SD0 to SD27.

The digital sound signal generator 50 outputs musical tunes and sound effects from the speaker unit 95 using the entered sound data and the sound source data in the sound buffer 51.

Figure 3:
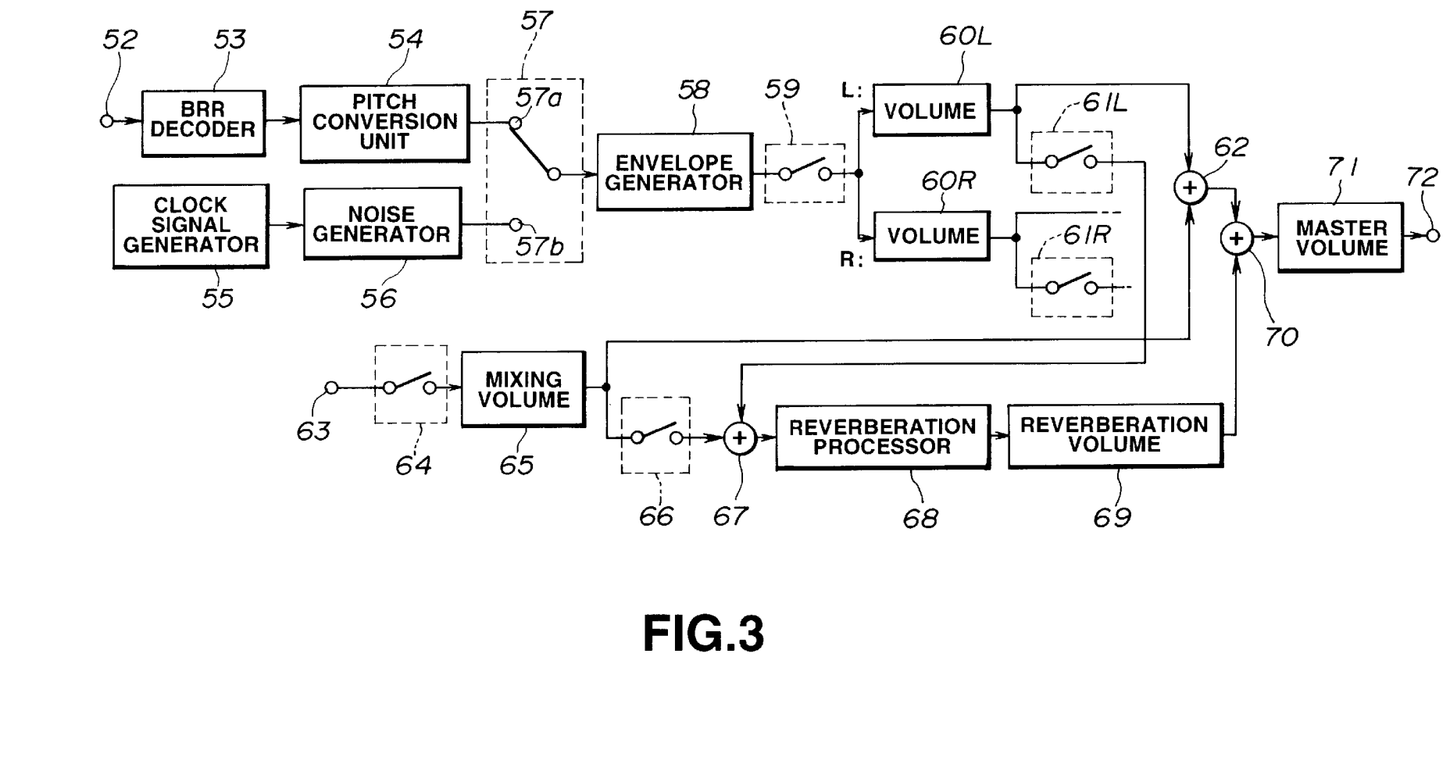
FIG. 3 is a view schematically showing the structure of a digital sound signal generator.

FIG. 3 schematically shows the structure of the digital sound signal generator, which will now be described in detail.

The digital sound signal generator as shown in this embodiment has a BRR decoder 53 for reading out the so-called sound source data which is the 4-bit ADPCM data of FIG. 2 from the sound buffer 51 and performing decoding corresponding to the encoding with reduced bit rate carried out on the ADPCM data to convert the ADPCM data to PCM data. The digital sound signal generator also has a pitch conversion unit 54 for converting the pitch of the converted PCM data, a clock signal generator 55 for generating a clock signal, a noise generator 56 for generating a noise based on the resulting clock, a signal switching unit 57 for switching an output from the pitch conversion unit 54 and an output of the noise generator 56, an envelope generator 58 for adjusting the level of an output of the signal switching unit 57 to convert an envelope of a sound generated with the amplitude of its output waveform varied, a mute processing unit 59 for being turned off in muting, and left and right volume control units 60L, 60R for adjusting the sound volume and balance between left and right channels. With this digital sound signal generator, sounds using the sound source data are outputted.

FIG. 3 only shows the circuit structure for outputting one sound (one voice). However, the digital sound signal generator of this embodiment can also output sounds of 24 voices, and has circuit structures from the pitch conversion unit 54 up to the volume control units 60L, 60R corresponding respectively to the 24 voices. Thus, with this digital sound signal generator, the left channel and the right channel of each voice are synthesized to output sounds of two channels, that is, the left and right channels.

Also, the sound source data stored in the sound buffer 51, the envelope, the sound volume and the balance of left and right channels may be set separately for each voice.

With this digital sound signal generator, it is possible to mix the sound signal fed from the CD-ROM decoder 80 of FIG. 1 with the sound output, and to perform so-called reverberation processing of the sound output whereby the sound output is mixed with temporally preceding or succeeding sound outputs.

For mixing the sound signal appearing at terminal 63 with the generated sound output, the digital sound signal generator has a signal switching unit 64 for selecting whether the sound signal is to be entered and synthesized with the sound output or not, and a mixing volume control unit 65 for adjusting the sound volume of the sound signal to be mixed. Thus, when the sound signal is to be mixed with the sound output, the PCM data fed from the mixer 84 in the CD-ROM decoder 80 of FIG. 1 is entered at a signal input terminal 63 and is fed via the signal switching unit 64 to the mixing volume control unit 65. The mixing volume control unit 65 adjusts the sound volume of the sound signal fed thereto. The sound signal with its volume adjusted is fed to an adder 62 and is then mixed with the sound output from the volume control unit 60L.

FIG. 3 only shows the circuit structure for mixing the sound output of the left channel synthesized with the 24 voices of sound outputs outputted from the volume 60L and the sound signal of the left channel from the mixing volume 65. However, a circuit structure similar to that for the left channel is also provided for the right channel, and the mixing is carried out for the two channels, that is, the left and right channels.

With this digital sound signal generator, it is possible to perform so-called reverberation processing of the sound output whereby the sound output is mixed with temporally preceding or succeeding sound outputs.

For performing the reverberation processing, the digital sound signal generator has a signal switching unit 66 for switching whether the sound signal is to be used for the reverberation processing or not, an adder 67 for adding the sound signal from the signal switching unit 66 to the sound output outputted via a signal switching unit 61L, a reverberation processor 68 for performing reverberation using the sound signal from the adder 67, a reverberation volume control unit 69 for adjusting the sound volume of the reverberated sound signal, an adder 70 for mixing the output with its volume adjusted by the reverberation volume 69 and temporally preceding or succeeding sound outputs outputted from the adder 62, and a master volume control unit 71 for adjusting the sound volume of the sound signal outputted from the adder 70. Thus, the sound signal from the mixing volume control unit 65 is used as the sound to be mixed with the sound output.

The sound signal outputted from the adder 67 is entered to the reverberation processor 68 where it is temporally shifted forward or backward and is fed to the reverberation volume control unit 69. The reverberation volume control unit 69 adjusts the sound volume of the sound signal fed thereto. The sound signal with its volume adjusted is fed to the adder 70 where it is synthesized with the sound signal from the adder 62.

The processing operation of the sound source data as shown in FIG. 2 in the digital sound signal generator will now be described.

The CPU 90 of FIG. 1 picks out selection information indicating the sound source data of the sound to be outputted, length information of the sound, interval information of the sound, envelope information for determining the color of the sound, and volume information of the sound from the main memory 91, and feeds these information to the digital sound signal generator 50. The digital sound signal generator reads out sound source data from the sound buffer 51 on the basis of the selection information fed thereto, and enters the sound source data from a sound source data input terminal 52. The digital sound signal generator also controls the input of the sound source data from the sound buffer 51 on the basis of the length information of the sound from the CPU 90.

The sound source data thus entered is fed to the BRR decoder 53 where it is decoded, and is converted to 16-bit PCM data. The decoding by the BRR decoder 53 is carried out on 4 samples at the maximum for 1Ts with respect to each voice. The decoding result is temporarily stored in an internal memory, not shown. The stored data are used for arithmetic operation for pitch conversion by the pitch conversion unit 54, and the rate of BRR decoding is determined in accordance with the amount of consumed data. Specifically, as less data is consumed in pitch conversion, BRR decoding is performed less frequently.

The filter information FL in the sound parameter area PA of the sound source data of FIG. 2 will now be described with reference to FIG. 4.

Figure 4:
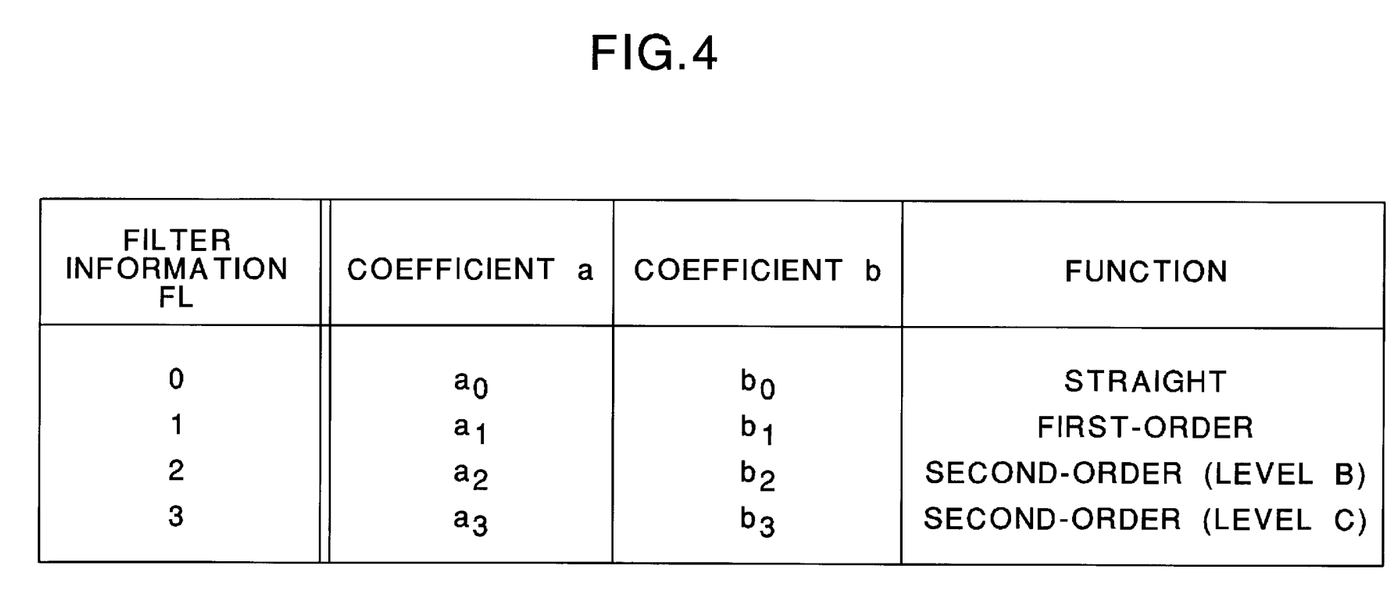
FIG. 4 is a view for illustrating filter information.

As shown in FIG. 4, one of four types of predictive filters, that is, straight, first-order, second-order (Level B) and second-order (Level C), is selected in accordance with the value indicated by the filter information FL. Coefficients a and b are determined by the value of the filter information FL.

Predictive filters selected in accordance with values of 2 and 3 of the filter information FL are used for decoding the 4-bit ADPCM data based on the CD-ROM XA standard. These predictive filters may be used when the sound data as shown in FIG. 2 is the 4-bit ADPCM data.

The decoding result $X_n$ (16-bit data) of a current sample is expressed by the following equation (2)

$$X_n = 2^{(12-RA)} D_n + aX_{n-1} + bX_{n-2} \qquad (2)$$

where $D_n$ denotes the 4-bit sound source data, $X_{n-1}$ (16-bit data) denotes the decoding result one sample before, and $X_{n-2}$ (16-bit data) denotes the decoding result two samples before.

The PCM data outputted from the BRR decoder 53 is entered to the pitch conversion unit 54. The pitch conversion unit 54 carries out arithmetic operation for pitch conversion based on the interval information of the sound from the CPU 90, to convert the interval, that is, the pitch of the sound generated by the entered PCM data. The sound data with its pitch converted is fed to a terminal 57a in the signal switching unit 57.

On the other hand, the clock signal generated by the clock signal generator 55 is fed to the noise generator 56 to generate a noise. The noise generator 56 is to generate a noise based on, for example, an M-series pseudo-random number. The resulting noise is fed to a terminal 57b in the signal switching unit 57.

The digital sound signal generator switches the signal switching unit 57 to the terminals 57a or 57b on the basis of the control command by the CPU 90 of FIG. 1, so that the sound data from the pitch conversion unit 54 or the noise from the noise generator 56 is selected and outputted to the envelope generator 58.

The envelope generator 58 performs so-called ADSR control based on the envelope information from the CPU 90, to determine the color of the sound to be outputted.

The sound data for the left channel and the sound data for the right channel of the output from the envelope generator 58 are fed via the signal switching unit 59 to the volume control unit 60L and the volume control unit 60R, respectively. The volume control units 60L, 60R adjust the sound volume on the basis of the volume information from the CPU 90, to output the sound output.

Thus, the 24 voices of sounds are generated and outputted respectively. The left and right channels of each voice are synthesized so that the sound output for two channels, that is, the left and right channels, is generated.

The sound output for the two channels (the left and right channels) is mixed with the sound signal outputted from the mixing volume 65 by the adder 62, and is then further mixed with the sound signal outputted from the reverberation volume control unit 69 by the adder 70, as described above. This mixed sound output has the volume of its sound to be outputted adjusted by the master volume control unit 71, and is then outputted from the sound signal output terminal 72. Thus, sounds are generated from the speaker unit 95 of FIG. 1.

The digital sound signal processing device as described above is preferably adapted for the household game equipment or the like. An embodiment of a household game equipment employing the digital sound signal processing device will now be described with reference to FIG. 5, which schematically shows the structure of the equipment.

Figure 5:
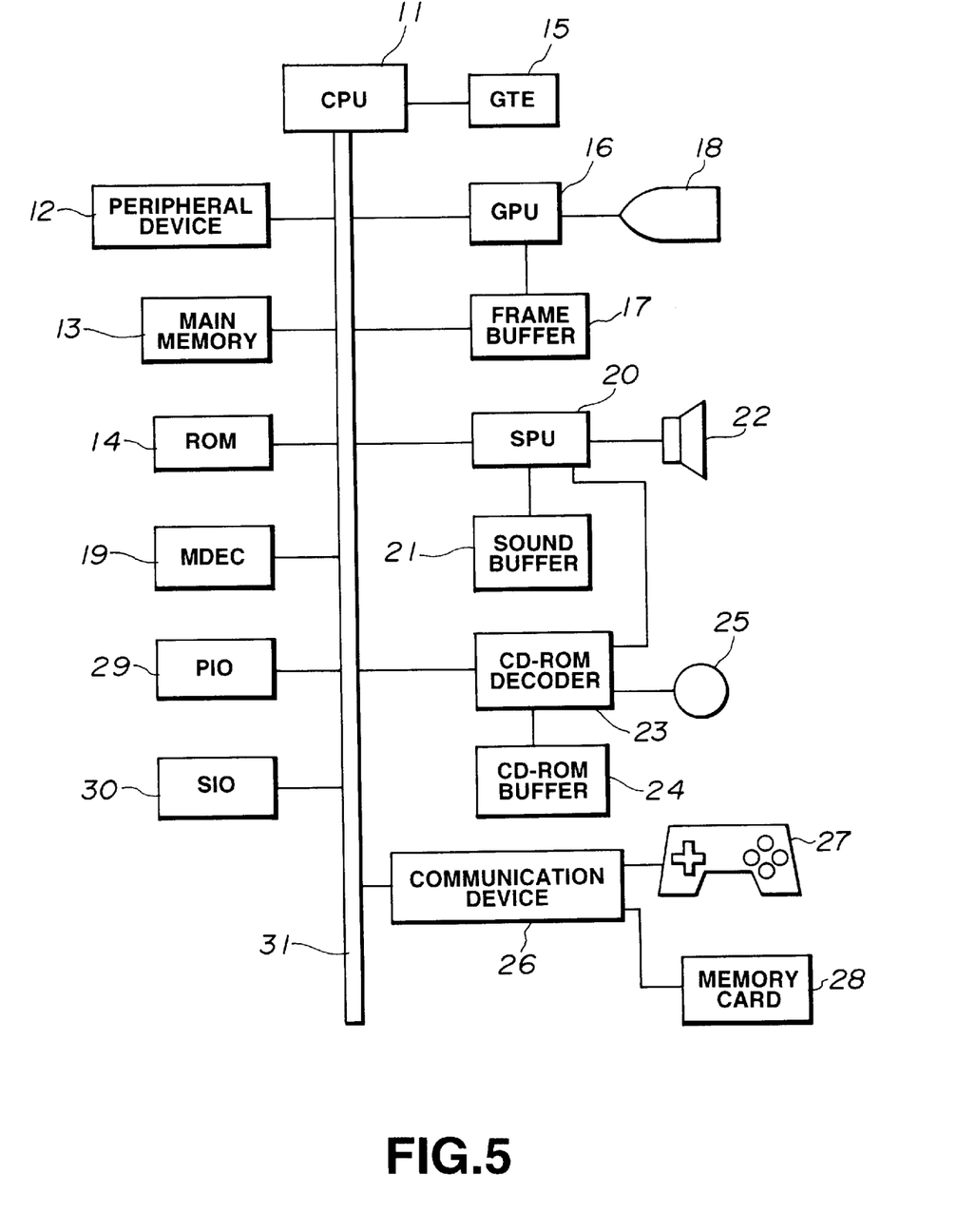
FIG. 5 is a view schematically showing the structure of household game equipment.

The household game equipment is constituted by connecting to a bus 31 plural processors and devices for realizing various functions in a main system including a CPU 11 and a peripheral device 12, a graphic system, a sound system, a CD-ROM system and a communication system.

The CPU 11 defining the basic part of the main system is a 32-bit reduced instruction set computer (RISC) CPU. The peripheral device 12 includes plural controllers, such as, DMA, timer and interrupt. A main memory 13 with a capacity of 2 MBytes, a ROM 14 having a capacity of 512 KBytes with an operating system (OS) program enclosed therein for controlling the operation of the CPU 11 and the peripheral device 12 to control the household game equipment, a PIO 29 as an input/output (I/O) part of parallel communications, and an SIO 30 as an input/output (I/O) part of serial communications are also connected to the bus 31.

When the power of the household game equipment is turned on, the CPU 11 executes the OS in the ROM 14 to initialize the entire device. At a control command by the CPU 11, an application program, that is, a game program or picture or sound data loaded in a CD-ROM drive 25 of the CD-ROM system is read out.

Specifically, the picture data recorded in the CD-ROM includes picture data of a motion picture or a still picture which has been orthogonally transformed by discrete cosine transform (DCT) and compressed, and picture data of a texture picture for modifying a polygon. As the picture data of a motion picture or a still picture, data compressed on the basis of the standard of Joint Photographic Experts Group (JPEG) as an international standard for compression of still picture data, and data compressed only by intra-frame encoding on the basis of the standard of Moving Picture Image Coding Experts Group (MPEG) as an international standard for compression of motion pictures, are employed. The game program from the CD-ROM includes a polygon drawing command for drawing a minute polygonal area or a polygon.

The sound data recorded in the CD-ROM includes 16-bit PCM data based on the CD-DA standard for sound data in music CDs, and adaptive differential PCM (so-called ADPCM) data based on the CD-ROM XA standard for CD-ROM picture and sound data.

The data read out from the CD-ROM is enclosed in the CD-ROM buffer 24, and is then decoded by a CD-ROM decoder 23. The resulting data is fed to the main system, the graphics system or the sound system in accordance with the content of the data.

The graphics system is constituted by a geometry transfer engine (GTE) 15 as a graphics data generating processor, a graphics processing unit (GPU) 16 as a graphics drawing processor, a frame buffer 17 with a capacity of 1 MBytes used for generating a picture by the GPU 16, a motion decoder (MDEC) 19 as a picture data expanding engine, and a video output unit 18, such as, a CRT display unit or a liquid crystal display (LCD) unit.

The GTE 15, used as a co-processor of the CPU 11, carries out, at a high speed, coordinate conversion or light source calculation for a polygon expressing a three-dimensional object in a picture, for example, calculation of a matrix or a vector in fixed decimal mode, with a parallel processing mechanism when the CPU 11 generates the drawing command or the control command.

The GPU 16, operative in accordance with the polygon drawing command from the CPU 11, draws a polygon in the frame buffer 17 mapped in a two-dimensional address space independent of the CPU 11. The GPU 16 performs flat shading in which a polygon is drawn in the same color, gouraud shading in which an arbitrary color is designated for each vertex of the polygon to find the color within the polygon, and texture mapping in which a texture as two-dimensional image data is applied to the polygon.

Specifically, when the flat shading is carried out in which a polygon of triangle is drawn in the same color, the GTE 15 can perform coordinate calculation of approximately 1.5 million polygons per second at the maximum. When the gouraud shading or the texture mapping is carried out, the GTE 15 can perform coordinate calculation of approximately 5 hundred thousand polygons per second at the maximum. Therefore, it is possible to reduce the load on the CPU 11 and to carry out high-speed coordinate calculation.

The frame buffer 17 is constituted by a so-called dual port RAM of 16 bits, which is a rectangular area of 512 vertical pixels and 1024 horizontal pixels. The frame buffer 17 is used for drawing of pictures by the GPU 16 and enclosure of data transferred from the main memory 13. The drawing by the GPU 16 or the data transfer from the main memory 13, and reading of picture data are carried out simultaneously. In the frame buffer 17, a texture area in which a texture pattern is enclosed and a CLUT area in which a color lookup table (CLUT) used as a color pallet is enclosed. The texture pattern and the CLUT data are read out from the CD-ROM drive 25 under the control by the CPU 11, then transferred via the GPU 16 to the frame buffer 17, and enclosed therein. The CLUT data may also be generated by the GPU 16.

Accordingly, the GPU 16 draws the polygon using the coordinate and color information found by the GTE 15, and applies the texture to the polygon so as to produce a three-dimensional (3D) picture. The resulting picture data is outputted as a picture signal to the video output unit 18, so that the three-dimensional (3D) picture is displayed.

When a motion picture is to be displayed, two rectangular areas are provided on the frame buffer 17, and the two rectangular areas are used alternately for drawing and for picture display so that a frame picture is drawn in one of the rectangular areas with data of a frame picture drawn in advance in the other rectangular area being outputted to the video output unit 18 to display the picture. Thus, a state of picture rewriting is prevented from being displayed on the video output unit 18.

The MDEC 19, used for reproducing picture data read out from the CD-ROM 25, carries out parallel operation using the main memory 13 in common with the CPU 11. The data for motion pictures read out from the CD-ROM drive 25 is error-corrected by the CD-ROM decoder 23 and is fed to the MDEC 19. The MDEC 19 decodes the data fed thereto. The decoded data is then fed as motion picture data to the main memory 13. The motion picture data fed to the main memory 13 is enclosed in the frame buffer 17 via the GPU 16, and is then outputted as a picture signal to the video output unit 18 so that the motion picture is displayed.

The sound system is constituted by a sound processing unit or so-called SPU 20 as a sound reproducing processor, a sound buffer 21 of 512 KBytes used for the SPU 20 to reproduce sound signals, and a sound output unit 22, such as, a speaker unit.

The SPU 20 has an ADPCM decoding function to reproduce sound data produced by performing ADPCM of 16-bit sound data to a 4-bit differential signal, a reproducing function to reproduce sound source data stored in the sound buffer 21 to generate sound effects, and a modulating function to modulate the sound source data for reproduction.

Sound data used for background music (BGM) and sound source data used for generating sound effects are recorded in the CD-ROM. These data are read out from the CD-ROM drive 25 and error-corrected by the CD-ROM decoder 23 under the control of the CPU 11.

The sound data used for BGM is fed from the CD-ROM decoder 23 to the SPU 20 under the control of the CPU 11, and then is outputted as musical tunes from the sound output unit 22 by the SPU 20. The sound source data used for sound effects is enclosed in the sound buffer 21 under the control of the CPU 11. The SPU 20 generates musical sounds and sound effects based on the sound source data stored in the sound buffer 21. Thus, SPU 20 is a so-called sampling sound source.

The communication system is constituted by a controller 27 as an input device or an input pad, a memory card 28 of 1 MBytes, and a communication device 26 as a synchronization serial port.

The controller 27 has a key for entering an instruction for controlling the proceedings of a game and the motion of an object displayed in the game. The operation information entered from the controller 27 is fed to the communication device 26. The information fed to the communication device 26 is read out by the CPU 11 approximately every ⅙₀ second. The CPU 11 sends the control command for controlling the operations of the peripheral device 12, the main memory 13, the graphics system, the sound system, and the CD-ROM system, to control the operations of these systems. Thus, pictures corresponding to the entered operation information is displayed and sounds are outputted.

The memory card 28 is constituted by a non-volatile memory like a flush memory, and is used for enclosing and holding the setting, states of proceedings and results of plural games. Since the memory card 28 is separated from the bus 31, the memory card 28 can be attached or detached with the power on. Thus, it is possible to attach and detach plural memory cards during the operation of the household game equipment so as to store data.

The game equipment may be connected to the peripheral device via the PIO 29. The game equipment may also have communications with other game equipment via the SIO 30.

In the household game equipment, it is necessary to transfer a large amount of picture data at a high speed between the main memory 13, the GPU 16, the MDEC 19 and the CD-ROM decoder 23 when reading of the game program, display of the picture data or drawing of the picture data is to be carried out. In this case, so-called DMA transfer is carried out in which the picture data is directly transferred under the control of the peripheral device 12, not via the CPU 11. Thus, the load on the CPU 11 due to data transfer is reduced, and high-speed data transfer is carried out.

As is clear from the above description, the sound source data generating method according to the present invention includes the steps of: generating 14-byte sound information consisting of 28 samples of 4-bit adaptive differential PCM data; and generating 2-byte sound source parameters consisting of start information and end information of a looping section, predictive filter information expressing the type of an adaptive differential PCM predictive filter, and range information for expanding the 4-bit adaptive differential PCM data to 16-bit data, to generate 16-byte sound source data based on complete blocks from the 14-byte sound information and the 2-byte sound source parameters. Thus, decoding and generation of sounds using the sound source data can be easily carried out. Also, as the predictive filter used for BRR encoding in generation of the sound source data, the same filter as the predictive filter used for BRR encoding in generation of data based on the CD-ROM XA standard can be employed. That is, in generation of the sound source data, encoding can be carried out by an encoder for the data based on the CD-ROM XA standard.

The recording medium according to the present invention has recorded therein 16-byte sound source data based on complete blocks, the 16-byte sound source data being constituted by 14-byte sound information consisting of 28 samples of 4-bit adaptive differential PCM data, and by 2-byte sound source parameters consisting of start information and end information of a looping section, predictive filter information expressing the type of an adaptive differential PCM predictive filter, and range information for expanding the 4-bit adaptive differential PCM data to 16-bit data. Thus, if the same filter as the predictive filter used for BRR encoding in generation of data based on the CD-ROM XA standard can be employed as the predictive filter used for BRR encoding in generation of the sound source data, the same filter as the predictive filter for BRR decoding of the data based on the CD-ROM XA standard can be used for decoding and generation of sounds using the sound source data.

The sound source data processing device according to the present invention includes: memory means for storing therein 16-byte sound source data based on complete blocks which is constituted by 14-byte sound information consisting of 28 samples of 4-bit adaptive differential PCM data, and by 2-byte sound source parameters consisting of start information and end information of a looping section, predictive filter information expressing the type of an adaptive differential PCM predictive filter, and range information for expanding the 4-bit adaptive differential PCM data to 16-bit data; and decoding means for decoding the 4-bit adaptive differential PCM data in the block to 16-bit data using the predictive filter information and rate information of the sound source data based on blocks stored in the memory means. Thus, if the same filter as the predictive filter used for BRR encoding in generation of data based on the CD-ROM XA standard can be employed as the predictive filter used for BRR encoding in generation of the sound source data, the same filter as the predictive filter for BRR decoding of the data based on the CD-ROM XA standard can be used for decoding and generation of sounds using the sound source data.

The start information and the end information of the looping section are information indicating a start block and an end block respectively of a looping section composed of one or more blocks. Thus, it is possible to loop the sound source data over plural blocks and to generate more natural sounds.

As is clear from the above description, the sound data processing device according to the present invention includes: envelope means for providing an envelope by enclosing sound source data consisting of 4-bit adaptive differential PCM data and sound data which is 16-bit PCM data different from the sound source data; and sound output means for decoding the sound source data read out from the enclosing means to perform pitch conversion and outputting sounds with a signal level controlled; and mixing means for mixing a sound output from the sound output means with the real sound data read out from the enclosing means. Thus, the sound output generated from the sound source data and the sound data which is 16-bit PCM data can be easily mixed. Also, the circuit structure for mixing the sound output from the sound source data with the sound data which is 16-bit PCM data can be diminished.

In addition to the above structure, the sound data processing device according to the present invention further includes: second mixing means for mixing the real sound data with the sound output from the sound output means; and reverberation sound data mixing means for mixing sound data from the second mixing means, temporally shifted forward or backward, with the sound data from the mixing means. Thus, the sound data mixed by the second mixing means is temporally shifted and mixed with the sound data from the mixing means, so that reverberation sound data can be easily generated.

Figure 7:
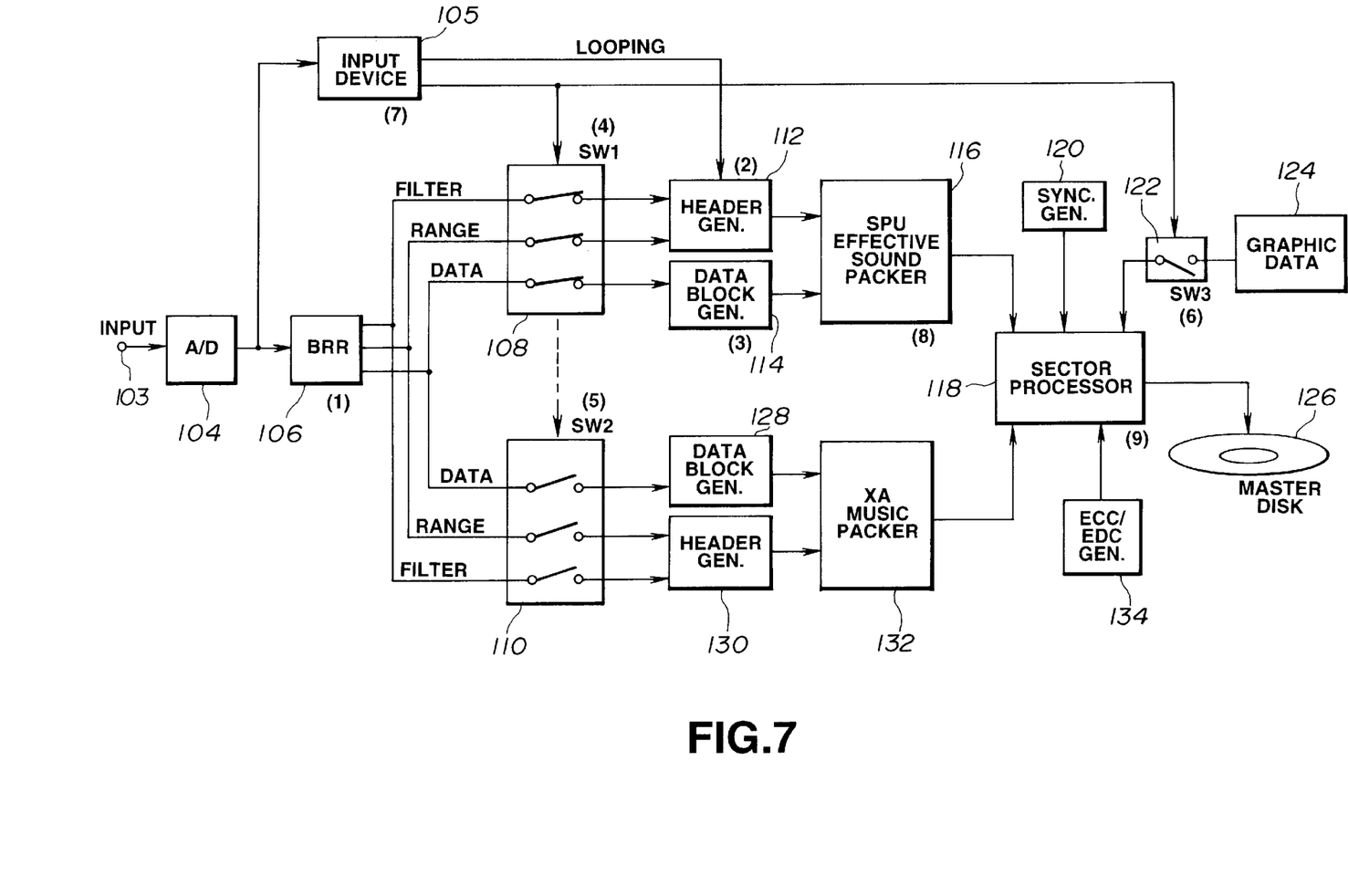
FIG. 7 is a view schematically showing the structure of an embodiment of an apparatus for recording sound source data according to the present invention.

FIG. 7 is an illustration for an apparatus for recording the storage disk with information required by the present invention.

Figure 8:
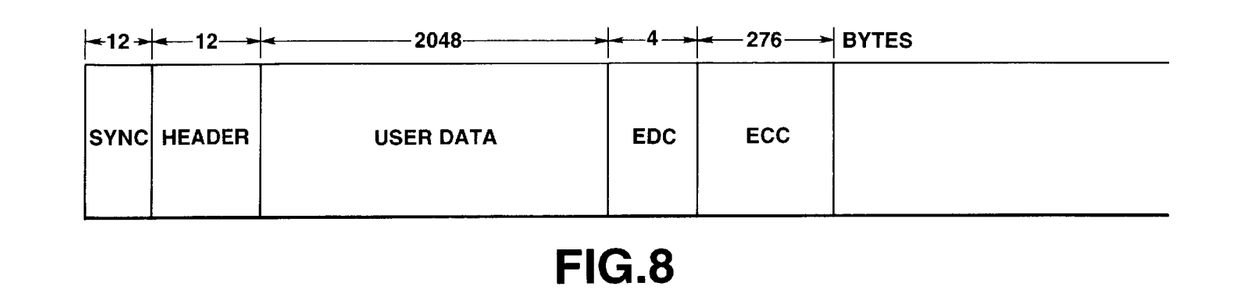
FIG. 8 is an illustration of the format of a recorded sector.

FIG. 8 illustrates a typical sector as recorded on the storage disk. The sector starts with 12-bytes of sync information, followed by a 12-byte header indicating the type of sector. This is followed by 2,048 bytes of user data, after which 4-bytes are devoted to EDC, and 276-bytes for ECC for error correction.

Figure 9:
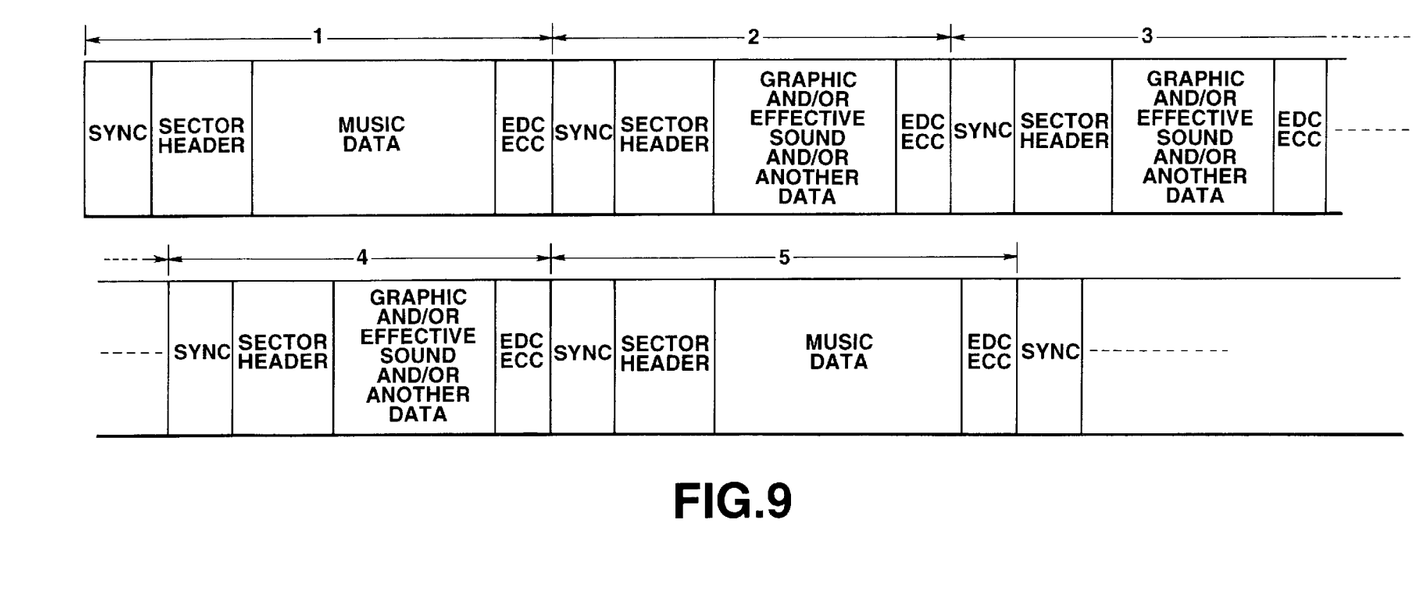
FIG. 9 Is an illustration of the format of several recorded sectors in accordance with the present invention.

FIG. 9 illustrates how a plurality of sectors are recorded successively on the storage disk with the user data representing either music data, or else graphic and/or sound effect or other data. FIG. 9 illustrates 5 sectors, in which the first and fifth sectors are devoted to music data, the other sectors devoted to data of other types.

FIG. 7 illustrates apparatus for arranging and recording the data in the sectors as shown in FIG. 9. An analog input is applied to input terminal 103, and converted to digital form by an analog to digital converter 104. The output of the analog to digital converter is connected to an input device 105, and to a BRR encoder 106. The BRR encoder 106 encodes both sound effect data and music data into the same format constituting blocks of 14-byte sound data each consisting of 28 samples of 4-bit adaptive differential PCM data. BRR encoder 106 supplies its output to two groups of switches 108 and 110. Each group has a switch for a filter information, range information, and other data, and if the switch 108 is closed, this data is supplied to a header generator 112 and to a data block generator 114.

The input device 105 determines which of the switches 108 or 110 is to be operated, in accordance with whether the data is music data or sound effect data. If the switch 108 is selected, the input device 105 also supplies looping information to the header generator 112. The header generator 112 and the data block generator 114 both supply outputs to an SPU effective sound packer of 116, which supplies its output to a sector processor 118 for recording on a master disk 126. A sync generator 120 is also connected to the sector processor 118, for supplying the necessary synchronization signals.

Another input to the sector processor 118 is derived from a switch 122, which is adapted to select either sound information from the input device 105, or graphic data from a graphic data source 124.

When the switch 110 is selected, the outputs of the switch 110 are supplied to a data block generator 128 and a header generator 130, and those units produce signals connected to the XA type music packer 132. Its output is connected to the sector processor 118. A further input of the sector processor 118 is derived from an ECC/EDC generator 134, which supplies the required ECC and EDC signals for error correction and the like.

By use of the apparatus in FIG. 7, the sectors on the master disk 126 can be recorded in the format illustrated in FIG. 9. It is apparent that various modifications and additions may be made in the apparatus and method of the present invention without departing from departing from the central features of novelty thereof, which are intended to be defined and secured by the appended claims.

What is claimed is:

1. A sound data processing apparatus comprising:
    memory means for storing 16-byte sound source data based on complete blocks which are each constituted by 14-byte sound information comprising 28 samples of 4-bit adaptive differential PCM data, and by 2-byte sound source parameters comprising looping information, predictive filter information and range information; and
    decoding means for decoding said 4-bit adaptive differential PCM data used to correspond to said sound source parameters.

2. An apparatus according to claim 1, wherein said looping information indicates a looping start block and a looping end block.

3. A sound source data reproducing apparatus comprising:
    first decoding means for decoding real sound data;
    second decoding means for decoding 16-byte sound sources data based on complete blocks which are each comprised of 14-byte sound information comprising 28 samples of 4-bit adaptive differential PCM data, and by 2-byte sound source parameters comprising looping information, predictive filter information and range information; and mixing means for mixing said decoded real sound data with said decoded 4-bit adaptive differential PCM data.

4. A sound source data reproducing apparatus comprising:
    first decoding means for decoding real sound data;
    second decoding means for decoding sound source data encoded by 4-bit adaptive differential PCM data;
    first mixing means for mixing said decoded real sound data with said decoded 4-bit adaptive differential PCM data further comprising:
        second mixing means for mixing said decoded real sound data with decoded 4-bit adaptive differential PCM data;
        delay means for delaying the output data of said second mixing means; and
        third mixing means for mixing the output of said delay means with the output of said first mixing means.

5. A method for processing sound data, comprising the steps of:
    storing 16-byte sound source data based on complete blocks which are each constituted by 14-byte sound information consisting of 28 samples of 4-bit adaptive differential PCM data, and by 2-byte sound source parameters consisting of looping information, predictive filter information and range information; and
    decoding said 4-bit adaptive differential PCM data used to correspond to said sound parameters.

6. The method according to claim 5, wherein said looping information indicates a looping start block and an end block.

7. A method for processing sound data, comprising the steps of:

decoding real sound data; decoding 16-byte sound source data based on complete blocks which are each constituted by 14-byte sound information comprising 28 samples of 4-bit adaptive differential PCM data, and by 2-byte sound source parameters comprising looping information, predictive filter information and range information; and mixing said decoded real sound data with said decoded 4-bit adaptive differential PCM data.

8. A method for processing sound data comprising the steps of:

decoding real sound data;

decoding sound source data encoded by 4-bit adaptive differential PCM data;

a first mixing step of mixing said decoded real sound data with said decorded 4-bit adaptive differential PCM data;

delaying the output data of said first mixing step; and a second mixing step of mixing the output of said delaying step with the output of said first mixing step.

9. An apparatus according to claim 2, wherein said looping information is comprised of 3 bits.

10. An apparatus according to claim 2, wherein said looping information indicates a looping block.

11. An apparatus according to claim 1, wherein said predictive filter information is comprised of 4 bits.

12. An apparatus according to claim 1, wherein said range information is comprised of 4 bits.

13. An apparatus according to claim 12, wherein said range information has a value of from 0 to 12.

14. A method according to claim 6, wherein said loping information is comprised of 3 bits.

15. A method according to claim 6, wherein said looping information indicates a looping block.

16. A method according to claim 5, wherein said predictive filter information is comprised of 4 bits.

17. A method according to claim 5, wherein said range information is comprised of 4 bits.

18. A method according to claim 17, wherein said range information has a value of from 0 to 12.

19. An apparatus according to claim 3, wherein said looping information indicates a looping start block and a looping end block.

20. An apparatus according to claim 19, wherein said looping information is comprised of 3 bits.

21. An apparatus according to claim 19, wherein said looping information indicates a looping block.

22. An apparatus according to claim 3, wherein said predictive filter information is comprised of 4 bits.

23. An apparatus according to claim 3, wherein said range information is comprised of 4 bits.

24. An apparatus according to claim 23, wherein said range information has a value of from 0 to 12.

25. A method according to claim 7, wherein said looping information indicates a looping start block and a looping end block.

26. A method according to claim 25, wherein said looping information is comprised of 3 bits.

27. A method according to claim 25, wherein said looping information indicates a looping block.

28. A method according to claim 7, wherein said predictive filter information is comprised of 4 bits.

29. A method according to claim 7, wherein said range information is comprised of 4 bits.

30. A method according to claim 29, wherein said range information has a value of from 0 to 12'.

* * * * *